United States Patent [19]
Rettig

[11] 3,789,290
[45] Jan. 29, 1974

[54] VARIABLE SPEED MOTOR AND DRIVE CIRCUIT

[75] Inventor: Charles E. Rettig, Brookfield, Wis.

[73] Assignee: The Louis Allis Company, Milwaukee, Wis.

[22] Filed: Dec. 13, 1971

[21] Appl. No.: 207,088

[52] U.S. Cl. ............ 321/5, 307/223 B, 307/224 B, 318/227, 321/45 S, 331/45, 331/57
[51] Int. Cl. .............. H02m 7/52, H02p 1/26, H03k
[58] Field of Search ........... 321/5, 45 R, 45 C, 45 S; 318/227, 207 R; 307/223 B, 224 B, 252 M; 331/45, 57

[56] References Cited
UNITED STATES PATENTS
3,365,638 1/1968 Risberg ........................... 318/207 R
3,386,027 5/1968 Kilgore et al. ........................ 321/11

FOREIGN PATENTS OR APPLICATIONS
1,387,949 12/1964 France ................................. 331/45
236,874 6/1969 U.S.S.R. ........................... 307/223 B Primary Examiner—William H. Beha, Jr.

[57] ABSTRACT

A firing circuit for use with a diode isolated, capacitor commutated inverter utilizes the operative state of the inverter for directing the firing or gating pulses to sequentially firable thyristors in the inverter. A plurality of pulse distribution paths are included in the firing circuit, each of which includes the preceding thyristor in the firing sequence so that the operative state of the thyristors controls the operation of the firing circuit.

7 Claims, 4 Drawing Figures

PATENTED JAN 29 1974

3,789,290

INVENTOR.
CHARLES E. RETTIG
BY
ATTORNEY 3,789,290

VARIABLE SPEED MOTOR AND DRIVE CIRCUIT

BACKGROUND OF THE INVENTION

1. Field of the Invention

The present invention relates to gating or firing circuits for thyristors utilized in inverters.

2. Description of the Prior Art

Inverters are electronic circuits for changing direct current to alternating current. In the course of this alternation, a pluarlity of current control devices, such as thyristors, are sequentially gated or fired to provide the desired alternating current output.

The sequential gating may be provided by oscillator-ring counter circuitry. Such circuitry operates in a predetermined manner, independent of the actual operative condition of the thyristors. Should a fault occur in either the oscillatorring counter circuitry or the thyristors, the correlation between the two may be lost and further operation of the ring counter is likely only to cause additional malfunction of the inverter.

For this reason, the sequential gating of the thyristors is often made dependent on their actual operative state. Any faults in the thyristors may be immediately detected and the operation of the firing circuitry altered accordingly. Such a technique is sometimes termed "self steering".

In the past, firing circuitry utilizing the self steering principal has utilized resistor-capacitor circuits. Such circuits contain time constants which introduce undesirable time delays and may, in some cases, limit the frequency at which the thyristors may be sequentially gated.

SUMMARY OF THE PRESENT INVENTION

It is, therefore, the object of the present invention to provide an improved firing circuit for inverters which is capable of highly responsive operation over a wide range of frequencies, including high frequencies.

Another object of the present invention is to provide an inverter firing circuit which permits a reversal in the gating sequence of the thyristors and which permits the use of a thyristor pulse amplifier.

It is a further object of the present invention to provide an improved inverter firing circuit which is simple and flexible in operation and construction and which is capable of substantially troublefree operation for substantial periods of time.

Briefly, the present invention provides a firing circuit for an inverter of the type having a plurality of parallel current paths containing series connected thyristors and diodes. The thyristors are gated in sequence during operation of the inverter. The firing circuit includes a source of gating pulses and a pulse distribution network having a plurality of parallel pulse distribution paths, each of which includes the following elements: a means, such as a pulse transformer, for applying gating pulses to one of the thyristors; the next preceding thyristor in the gating sequence; and a blocking means, such as a diode, responsive to the conductive state of the next preceding thyristor for unblocking the pulse distribution path when the thyristor is in the conductive state. The diode is connected to one terminal of the pulse transformer. Through the action of the conductive thyristors and the diodes, the pulse distribution network directs the firing pulses to the next thyrsitor to be fired in the gating sequence to effect the operation of the inverter. In as much as the firing circuit utilizes the present state of the inverter in controlling its future state, the firing circuit may be said to be self steering.

DESCRIPTION OF THE PREFERRED EMBODIMENT

Figure 1:
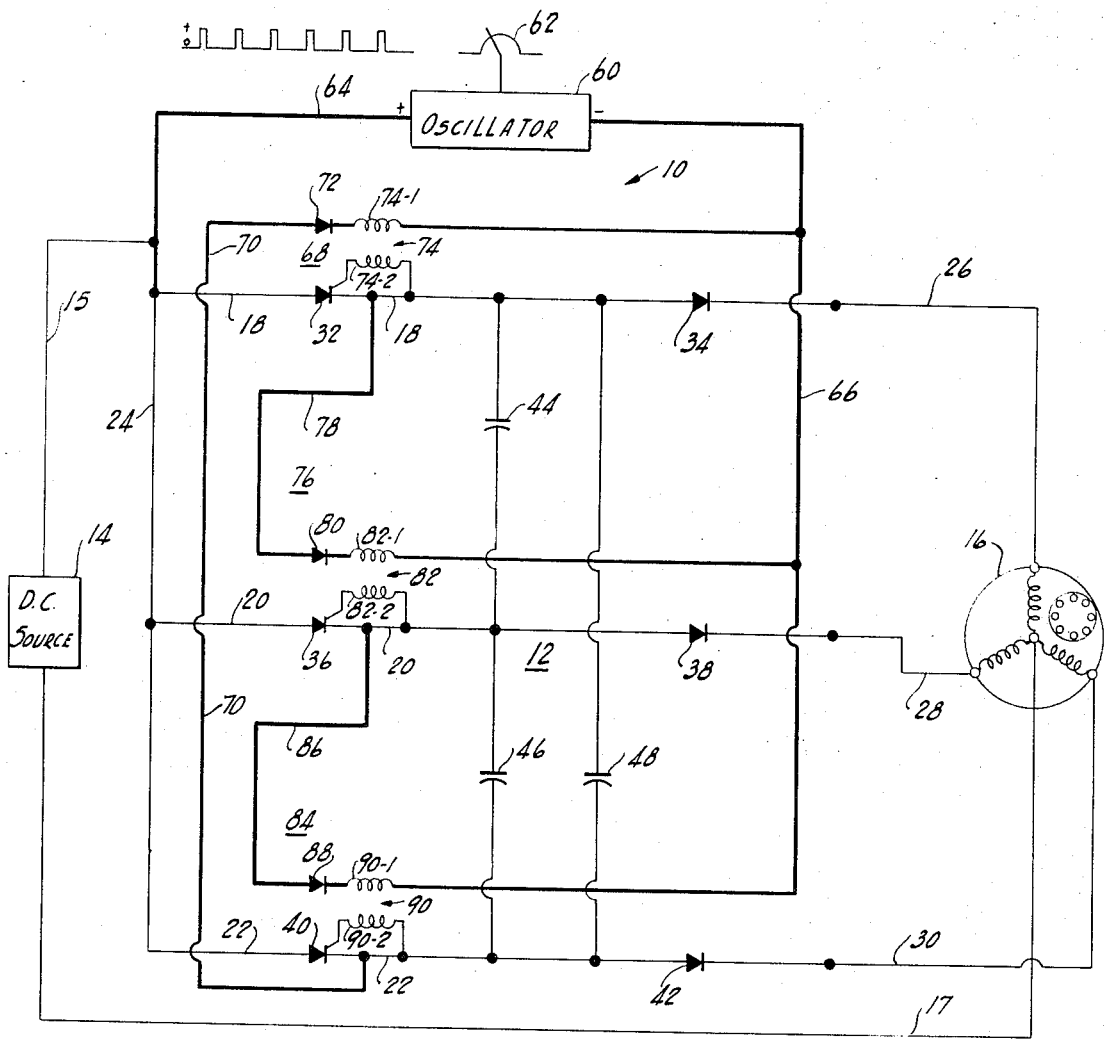
FIG. 1 is a schematic diagram of the firing circuit of the present invention shown in conjunction with a diode isolated, capacitor commutated inverter.

Turning now to FIG. 1, the improved firing circuit 10 of the present invention is shown in conjunction with inverter 12. Inverter 12 may be interposed between a source of direct current 14 and an alternating current load 16, such as an alternating current motor or other AC device having reactance which is sufficiently small as to permit alteration of the current in a time interval which is short compared to the period of the alternating current. The output of direct current source 14 may be provided in conductors 15 and 17.

Inverter 12 comprises three parallel current paths, conductor 18, conductor 20, and conductor 22 connected between conductor 24 and output conductors 26, 28 and 30. Conductor 24 is connected to conductor 15 and DC source 14 while output conductors 26, 28, and 30 are connected to alternating current load 16. The connection between alternating current load 16 and direct current source 14 is completed by conductor 17. Thyristor 32 and diode 34 are connected in series in conductor 18. Thyristor 36 and diode 38 are connected in series in conductor 20 and thyristor 40 and diode 42 are connected in series in conductor 22. Thyristors 32, 36, and 40 are gated or fired by firing circuit 10, hereinafter described.

A commutating capacitor is connected across each pair of current paths to effect turn off of the thyristors 32, 36, and 40. Capacitor 44 is connected across conductors 18 and 20, capacitor 46 is connected across conductors 20 and 22, and capacitor 48 is connected across conductors 18 and 22.

Inverter 12 which may be described as a diode isolated, capacitor commutated inverter, effects commutation by current transfer; that is, by transferring current out of one of the parallel current paths into another current path. In operation, inverter 12 causes a periodic and sequential application of the current from direct current source 14 to the alternating current load 16 in the form of square wave current pulses. The manner in which inverter 12 causes this periodic and sequential application of current is as follows. It may be assumed that thyristor 32 is in the conductive state and is supplying current from DC source 14 through diode 34 to conductor 26 and AC load 16. It may also be assumed that capacitor 48 and capacitor 44 have been charged such that a positive potential exists on the common connnection of the cathode of thyristor 32 and the upper plates of capacitors 48 and 44 and the anode of diode 34.

When the current flows through output conductor 26 of inverter 12 for a time period commensurate with the frequency of energization, thyristor 36 is gated. When thyristor 36 is gated, the current in thyristor 32 is extinquished by the voltage on capacitors 48 and 44. Thyristor 32 is thus commutated off by capacitors 48 and 44. The current from DC source 14 then flows through thyristor 36 but remains momentarily unchanged through diode 34, capacitors 44, 46, and 48 and output conductor 26. Current flow through capacitor 44 from thyristor 36 to diode 34 discharges capacitor 44 causing its voltage to go through zero and build up in the opposite polarity. As the voltage on capacitor 44 becomes equal to the voltage between conductors 26 and 28, diode 38 becomes unblocked and the voltage on capacitor 44 is applied to output conductors 26 and 28. This initiates current flow in conductor 28 and commences the transfer of current from output conductor 26 to output conductor 28. The transfer of current from output conductor 26 to output conductor 28 proceeds at an increasing rate as the voltage on capacitor 44 continues to build up, due to the output conductor 26 current still flowing through it. Finally, the complete current from DC source 14 is transferred, or commutated, into output conductor 28, leaving capacitor 44 charged with a very substantial negative potential at the upper plate and a corresponding positive potential at the lower plate, due to the leakage reactance of alternating current load 16.

During the above described commutation, at the same time current is flowing through capacitor 44, current is also flowing serially through capacitor 46 and capacitor 48 so that at the completion of the commutation, capacitor 46 has been charged with its upper plate positive and its lower plate negative. This charge and the charges on capacitor 44 and 48 are retained on the capacitors by the blocking, or isolating, action of the associated diodes.

When thyristor 40 is fired to continue the cyclical application of current to alternating current load 16, capacitors 44 and 46 effect the turn off of thyristor 36 and the commutation of current from output conductor 26 to output conductor 30 in a manner similar to that described above. When thyristor 32 is fired, capacitors 46 and 48 effect the turn off of thyristor 40 and the commutation of current from output conductor 30 to output conductor 26.

While the thyristors in inverter 12 have been shown as silicon controlled rectifiers in FIG. 1, it will be appreciated that other devices, such as gas filled tubes may be used.

Firing circuit 10 for inverter 12 includes a source of gating pulses for thyristors 32, 36, and 40. The gating pulse source may comprise oscillator 60 of the relaxation type which generates a train of gating pulses. The frequency of generation of these pulses, and the frequency of the alternating current applied to load 16 is determined by a control, shown diagrammatically as potentiometer 62. For purposes of analysis, oscillator 60 may be assumed to provide a train of positive voltage pulses in conductor 64 as shown diagrammatically in FIG. 1. Conductor 64 is connected to conductor 24.

A pulse distribution network is coupled to the output of oscillator 60 for sequentially distributing the pulses generated by the latter to thyristors 32, 36 and 40 to sequentially gate or fire the thyristors. This firing sequence of the thyristors may be assumed to be the same as used above in explaining the operation of inverter 12; that is, thyristor 32 is gated, then thyristor 36 is gated, then thyristor 40 is gated, then thyristor 32 is again gated, etc.

The pulse distribution network includes a plurality of parallel pulse distribution paths. The number of pulse distribution paths equals the number of thyristors in inverter 12. In the case of the three phase inverter 12 shown in FIG. 1, three pulse distribution paths are provided. The parallel pulse distribution paths are connected across oscillator 60 between conductor 64–24 and return conductor 66. One parallel pulse distribution path, path 68, includes, in series, conductor 64, conductor 24, conductor 22, thyristor 40, conductor 70, and conductor 66. Conductor 70 has one end thereof connected to the cathode of thyristor 40 so as to be responsive to the voltage existing on the cathode.

Conductor 70 contains the primary winding 74–1 of pulse transformer 74, the secondary winding 74–2 of which is connected to the gate and cathode of thyristor 32. It may be noted that pulse transformer 74, which fires thyristor 32 is connected in conductor 70 which is responsive to the voltage at the cathode of thyristor 40. This interconnection accounts for the successive firing of thyristors 40 and 32, in a manner hereinafter described. Conductor 70 also contains a voltage responsive blocking means connected to one terminal of pulse transformer primary winding 74–1. The voltage responsive means may comprise diode 72, poled in the polarity shown in FIG. 1.

The second parallel pulse distribution path, path 76, includes, in series, conductor 64, conductor 24, conductor 18, thyristor 32, conductor 78, and conductor 66. Conductor 78 has one end thereof connected to the cathode of thyristor 32 so as to be responsive to the voltage existing at the cathode terminal.

Conductor 78 contains the primary winding 82–1 of pulse transformer 82, the secondary winding 82–2 of which is connected to the gate and cathode of thyristor 36, thereby to provide for the successive firing of thyristors 32 and 36 in the manner hereinafter described. Cathode 78 also contains diode 80, connected to one terminal of pulse transformer primary winding 82–1 and poled in the polarity shown in FIG. 1.

A third pulse distribution path, path 84, includes, in series, conductor 64, conductor 24, conductor 20, thyristor 36, conductor 86, and conductor 66. Conductor 86 has one end thereof connected to the cathode of thyristor 36 so as to be responsive to the voltage existing on the cathode terminal.

Conductor 86 contains the primary winding 90–1 of pulse transformer 90, the secondary winding 90–2 of which is connected to the gate and cathode of thyristor 36, thereby to provide for the successive firing of thyristors 36 and 40 in a manner hereinafter described. Conductor 86 also contains diode 88 connected to one terminal of pulse transformer primary winding 90–1 and poled in the polarity shown in FIG. 1.

In considering the operation of firing circuit 10, it may be assumed that thyristor 40 is on and that current is flowing from direct current source 14 through conductor 24, conductor 22, thyristor 40, diode 42, output conductor 30, and load 16 back to DC source 14 in conductor 17. Thyristors 32 and 36 are not conductive.

The next thyristor to be fired in changing the direct current of source 14 to alternating current for application to alternating current load 16 is conductor 32.

Oscillator 60 provides a gating pulse in conductor 64–24. Since thyristors 32 and 36 are both off, the pulse cannot pass through either of these thyristors. Further, the negative voltage at the cathode of these non conductive thyristors places diodes 80 and 88 in the blocking state and prevents the application of the pulse to either pulse transformer 82 or 90.

However, as thyristor 40 is in the conductive state, the oscillator pulse passes from conductor 24, conductor 22, through thyristor 40 into conductor 70. Since there is a positive voltage at the cathode of thyristor 40 equal to the thyristor anode voltage less the small forward voltage drop of the thyristor, diode 72 is unblocked and the oscillator pulse passes through pulse transformer primary winding 74–1 and conductor 66 back to oscillator 60. The presence of the oscillator pulse in pulse transformer primary winding 74–1 generates a pulse in pulse transformer seconding winding 74–2 which applies a gating signal to thyristor 32 to render that thyristor conductive. Thyristor 40 is commutated off by capacitors 46 and 48, in the manner described above.

When thyristor 32 has been on for a period of time commensurate with the frequency of the alternating current energization of load 16, thyristor 36 may be gated on. The next gating pulse from oscillator 60 passes from conductor 64, conductor 24, and conductor 18, through conducting thyristor 32 into conductor 78. Since diode 80 is unblocked by the positive voltage on the cathode of thyristor 32, the oscillator pulse passes through pulse transformer primary winding 82–1 and conductor 66 back to oscillator 60. The presence of the oscillator pulse in pulse transformer primary winding 82–1 generates a pulse in pulse transformer secondary winding 82–2 which applies a gating signal to thyristor 36 to render that thyristor conductive. Thyristor 32 is commutated off by capacitors 44 and 48 in the manner described above.

The oscillator pulse cannot pass through previously non conductive thyristors 40 or 36 because of the anode voltage appearing on these thyristors and because diodes 72 and 88 are blocked by the negative thyristor cathode voltage.

When thyristor 36 has been on for a period of time commensurate with the frequency of the alternating current energization of load 16, thyristor 40 may be gated on. The gating pulse from oscillator 60 passes from conductor 64, conductor 24, and conductor 20, through conductive thyristor 36 into conductor 86. Since diode 88 is unblocked by the positive voltage on the cathode of thyristor 36, the oscillator pulse passes through pulse transformer primary winding 90–1 and conductor 66 back to oscillator 60. The presence of the oscillator pulse in pulse transformer primary winding 90–1 generates a pulse in pulse transformer seconding winding 90–2 which applies a gating signal to thyristor 40 rendering that thyristor conductive. Thyristor 36 is commutated off by capacitors 44 and 46 in the manner described above.

The oscillator pulse cannot pass through previously non conductive thyristors 40 or 32 because of the anode voltage appearing on these thyristors and because diodes 72 and 80 are blocked by the cathode voltage.

The above described sequential operation is continued to supply the desired alternating current energization to alternating current load 16.

It will be appreciated that starting circuitry must be provided in connection with inverter 12 since if all the thyristors are off, as during shut down, there will be no available path for the oscillator pulses and no means by which the thyristors may be gated. A starting circuit may thus be coupled to one of the thyristors to turn that thyristor on at start up and commence the operation of inverter 12. Such a starting circuit is shown in FIG. 2 in connection with thyristor 32 in conductor 18.

Starting circuit 100 includes a resistor-capacitor circuit comprising resistor 102 and capacitor 104 connected in series across thyristor 32. A breakover, or Shockley, diode 106 is connected intermediate the resistor and the capacitor and to the gate terminal of thyristor 32. In operation, the resistor-capacitor circuit integrates the voltage across thyristor 32. When the stored capacitor voltage exceeds the breakover point of diode 106, the voltage is applied to the gate of thyristor 32 to turn the thyristor on and commence the normal operation of inverter 12. By making the integration time of the resistor-capacitor circuit longer than the period of the lowest frequency of alternating current energization of load 16, starting circuit 100 will have no effect on the normal operation of inverter 12. Diode 108 and resistor 110, connected across resistor 102, may be used to hasten the discharge of capacitor 104 during normal operation of inverter 12.

Figure 2:
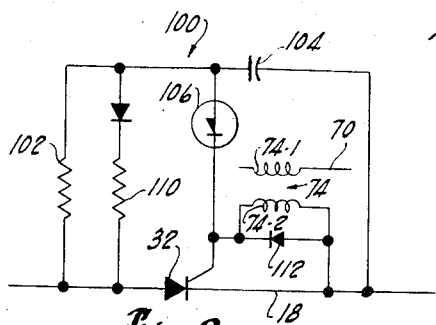
FIG. 2 is a partial schematic diagram showing a starting circuit which may be incorporated in the inverter shown in FIG. 1.

FIG. 2 also shows in exemplary fashion the use of diode 112 across the gate-cathode terminals of thyristor 32 to prevent the possible application of damaging negative voltages to the gate terminal.

Firing circuit 10 of the present invention may be used in a diode isolated, capacitor commutated inverter having the common thyristor anode configuration shown in FIG. 1 or an analogous common thyristor cathode configuration, not shown.

If it is desired to reverse the sequence of firing the thyristors in inverter 12, as for example, to reverse the direction of rotation of an alternating current motor forming alternating current load 16, the connection of the parallel pulse distribution paths to the thyristors may be reversed. The example used for explanative purposed above may be illustrated in tabular form by the table below:

TABLE I

| Thyristor in Conductive State | Thyristor Gated |
|---|---|
| 40 | 32 |
| 32 | 36 |
| 36 | 40 |
| 40 | 32 |

A reversal of the firing sequence is illustrated by the table below:

TABLE II

| Thyristor in Conductive State | Thyristor Gated |
|---|---|
| 40 | 36 |
| 36 | 32 |
| 32 | 40 |
| 40 | 36 |

Figure 3:
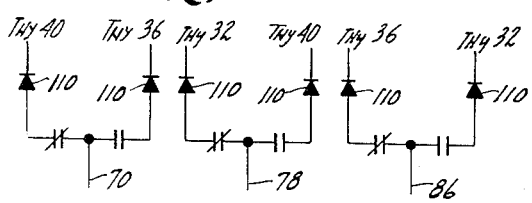
FIG. 3 is a partial schematic diagram showing relay circuitry which may be utilized to reverse the firing sequence of the thyristors in the inverter shown in FIG. 1.

The reverse firing sequence may be accomplished by connecting conductor 78 to the cathode of thyristor 40, conductor 70 to the cathode of thyristor 36, and conductor 86 to the cathode of thyristor 32. The foregoing alteration in the interconnection of the parallel pulse distribution paths may be accomplished by appropriate reversing relay means, as diagrammatically shown in FIG. 3 which shows the selective connection of the conductors to either of a pair of thyristors. Since there is a possibility of one set of relay contacts closing before the other set opens, diodes 110 are inserted in series with each of the contacts to prevent high voltage damage to the contacts which would otherwise occur if the closed contacts short the commutating capacitors 44, 46, and 48 connected across the contacts.

Figure 4:
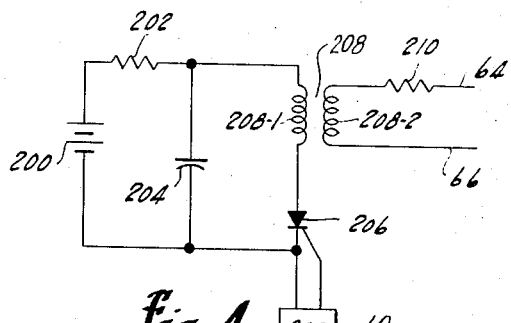
FIG. 4 is a partial schematic diagram showing a modification of the firing circuit shown in FIG. 1 incorporating thyristor pulse amplification means.

In applications in which high gate power is desired, a single small thyristor may be used in conjunction with oscillator 60 as a pulse amplifier, as shown in FIG. 4. A DC source, such as battery 200, is connected through a charge rate limit resistor 202 across capacitor 204. The thyristor 206 is connected in series with primary winding 208-1 across capacitor 204. Oscillator 60 is connected to the gate terminal of thyristor 206. One end of secondary winding 208-2 of pulse transformer 208 is connected through current limiting resistor 210 to conductor 64. The other end of the pulse transformer secondary winding is connected to conductor 66.

In operation battery 200 charges capacitor 204 through resistor 202. When thyristor 206 is gated, as by oscillator 60, the capacitor is discharged through pulse transformer primary winding 208-1 to provide a gating pulse in conductor 64. When the appropriate thyristor in inverter 12 is gated on, a signal from the inverter commutating capacitor will appear in secondary winding 208 and will be of a polarity to bias thyristor 206 off, thereby readying the thyristor for further pulse generating operation. For example, when thyristor 40 in inverter 10 is fired, capacitor 46 may be discharged through conductor 20, conductor 86, conductor 66, pulse transformer secondary winding 208-2, conductor 64, conductor 24, and thyristor 40. This discharge will turn off thyristor 206.

It will be appreciated that other modifications and alterations may be made to the present invention, as disclosed above, and it is intended to cover in the appended claims all such modifications and alterations as come within the true scope and spirit of the invention.

Various modes of carrying out the invention are contemplated as being within the scope of the following claims particularly pointing out and distinctly claiming the subject matter which is regarded as the invention.

I claim:

1. A circuit for providing gating pulses to an inverter of the type having a plurality of current paths containing series connected thyristors and diodes and having means for rendering said thyristors nonconductive, said circuit gating the thyristors in a gating sequence, and comprising:

a. a source of gating pulses having a selectively variable frequency;
  b. a pulse distribution means for selectively energizing successive ones of the thyristors, said pulse distributing means including pulse distribution paths equal in number to the number of said thyristors, each said pulse distribution path including a diode and a pulse transformer, said pulse transformer having a primary and a secondary winding, said diode of each said pulse distribution path connected in series with a primary winding of a pulse transformer, one end of each said pulse distribution path connected to a corresponding one of the current paths at a point between the thyristor and the diode, the other end of each said pulse distribution path coupled to said pulse source, the thyristors being gated into conduction sequentially by said pulse distribution paths, each pulse from said pulse source passing only through a conducting first one of the thyristors and through a diode in a first pulse distribution path connected thereto to generate a pulse in the secondary winding of said pulse transformer connected thereto to render another of the thyristors conducting and each said pulse distribution path connected to a nonconducting thyristor being blocked from conducting, the previously conducting first thyristor being rendered nonconductive by said means therefor whenever a second one of said thyristors is pulsed into conduction by a second one said pulse distribution paths thereby energizing each one of the plurality of current paths of the inverter in succession; and
  a circuit for starting circuitry coupled to a first one of the thyristors including a resistor and a capacitor connected in series across said first one of the thyristors, and a breakover diode connected intermediate the resistor and capacitor to a gate terminal of said first one of the thyristors; the starting circuitry causing one thyristor to conduct initially when all of the thyristors are in a state of nonconduction thereby preventing gating pulses from passing.

2. The circuit according to claim 1 wherein said source of gating pulses comprises an oscillator.

3. The circuit according to claim 2 wherein said source of gating pulses includes power amplification means for amplifying the output of said oscillator.

4. The circuit of claim 3 wherein said amplification means includes a thyristor gated by said oscillator.

5. The circuit of claim 4 wherein said means for rendering the thyristors non-conductive is commutating capacitors, the capacitive means being capable of providing a signal in said parallel pulse distribution paths and said amplification means further includes means coupling said amplification means thyristor to said parallel pulse distribution paths for receiving the signal from the capacitive commutation means for turning off said thyristor.

6. A circuit for providing gating pulses to an inverter of the type having a plurality of current paths containing series connected thyristors and diodes and having means for rendering said thyristors nonconductive, said circuit gating the thyristors in a gating sequence, and comprising:

a. a source of gating pulses having a selectively variable frequency;
  b. a pulse distribution means for selectively energizing successive ones of the thyristors, said pulse distributing means including pulse distribution paths equal in number to the number of said thyristors, each said pulse distribution path including a diode and a pulse transformer, said pulse transformer having a primary and a secondary winding, said diode of each said pulse distribution path connected in series with a primary winding of a pulse transformer, one end of each said pulse distribution path connected to a corresponding one of the current paths at a point between the thyristor and the diode, the other end of each said pulse distribution path coupled to said pulse source, the thyristors being gated into conduction sequentially by said pulse distribution paths, each pulse from said pulse source passing only through a conducting first one of the thyristors and through a diode in a first pulse distribution path connected thereto to generate a pulse in the secondary winding of said pulse transformer connected thereto to render another of the thyristors conducting and each said pulse distribution path connected to a nonconducting thyristor being blocked from conducting, the previously conducting first thyristor being rendered nonconductive by said means therefor whenever a second one of said thyristors is pulsed into conduction by a second one said pulse distribution paths thereby energizing each one of the plurality of current paths of the inverter in succession; and c. insertion means including a relay means having contacts inserted in said parallel pulse distribution paths for coordinately inserting a different thyristor in each of said paths for altering the gating sequence of the thyristors.

7. The circuit of claim 6 wherein said inverter has capacitive means for rendering the inverter thyristors non-conductive and said relay means includes diodes connected in series with the contacts of said relay means for preventing discharge of the capacitive means across said relay contacts.

* * * * *